United States Patent

Vaughn et al.

[11] 3,860,441
[45] Jan. 14, 1975

[54] PROCESS AND COMPOSITION FOR WATER PROOFING SUBSTRATES

[75] Inventors: Walter L. Vaughn; Sherman Kottle; Richard H. Symm, all of Lake Jackson, Tex.

[73] Assignee: The Dow Chemical Company, Midland, Mich.

[22] Filed: Apr. 12, 1974

[21] Appl. No.: 460,326

Related U.S. Application Data

[60] Division of Ser. No. 218,009, Jan. 14, 1972, , which is a continuation-in-part of Ser. No. 9,975, Feb. 9, 1970, abandoned.

[52] U.S. Cl....... 117/65.2, 117/139.4, 117/139.5 A, 117/141, 117/142, 117/145, 117/148, 117/155 R, 117/161 UZ
[51] Int. Cl............................................. B44d 1/44
[58] Field of Search 117/65.2, 161, 139.4, 139.5 A, 117/148, 145, 155 R, 141, 142; 260/80.78, 33.8, 64, 67 FP, 80.8, 88.1 PC, 88.1 R, 78.3 UA, 89.5 S

[56] References Cited
UNITED STATES PATENTS

| | | | |
|---|---|---|---|
| 2,849,426 | 8/1958 | Miller | 260/79.5 R |
| 3,404,134 | 10/1968 | Rees | 260/78.5 T |
| 3,441,545 | 4/1969 | Blatz et al. | 260/78.5 T |
| 3,442,870 | 5/1969 | Lohse et al. | 117/132 B |
| 3,523,930 | 8/1970 | Maloney | 260/80.8 |
| 3,687,909 | 8/1972 | Vaughn | 260/80.78 |
| 3,787,366 | 1/1974 | Vaughn | 117/124 E |

FOREIGN PATENTS OR APPLICATIONS
1,024,388  3/1966  Great Britain

*Primary Examiner*—William D. Martin
*Assistant Examiner*—Janyce A. Bell
*Attorney, Agent, or Firm*—Walter J. Lee

[57] ABSTRACT

A process and composition for water proofing materials which comprises treating a reactive or polar substrate with at least one reactive polyalkylene copolymer of the formula

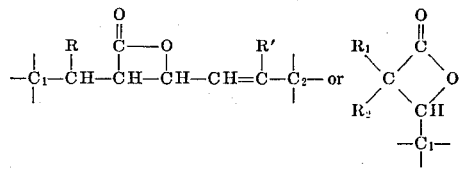

and curing the treated substrate at from 80°C. to 170°C. for from 0.1 minute to 3 hours; wherein $C_1$ and $C_2$ are carbon atoms in the main polyalkylene copolymer chain, R and R' are hydrogen, alkyl, phenyl, —COOH or a segment of a polyalkylene chain and $R_1$ and $R_2$ are alkyl, aryl, aralkyl, alkaryl, or the like, of up to about 20 carbon atoms. The treatment in accordance with the present invention results in an improvement in the water repellent properties of the treated substrate, and, additionally, shrinkproofs those substrates which were subject to shrinkage.

7 Claims, No Drawings

PROCESS AND COMPOSITION FOR WATER PROOFING SUBSTRATES

CROSS REFERENCE TO RELATED APPLICATIONS

This application is a divisional of application Ser. No. 218,009 filed Jan. 14, 1972 which is a continuation-in-part of application Ser. No. 9,975 filed Feb. 9, 1970 and now abandoned.

BACKGROUND OF THE INVENTION

The treatment of various materials to improve the resistance of said material to wetting by water is well known, the "sizing" of paper being one example. To date many materials have been "sized," or water proofed, from an aqueous bath. However, the disposition of the used aqueous bath has led to a great number of water pollution problems.

There can be little doubt that the utilization of so-called "closed loop" solvent processes for applying agents such as sizes are highly desirable from the standpoint of pollution abatement.

The low molecular weight reactive polyalkylene copolymers (hereinafter called "reactive polymers") taught herein are suitably applied from such closed loop solvent processes, and, when applied in accordance with the present invention, improve the water repellent properties of suitable substrates, as well as dimensionally stabilizing said substrates which are susceptible to shrinking.

SUMMARY OF THE INVENTION

In accordance with the present invention, a suitable substrate is treated with one or more reactive polymers and cured at from about 80° to about 170°C. for 0.1 minute to 3 hours, as necessary.

The reactive polymers which have been found to impart improved water repellent properties, as well as dimensional stability, to the treated substrate may be one or more polyalkylene copolymers containing groups of the formulas

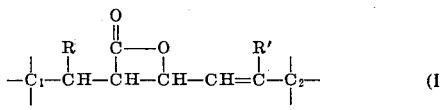 (I)

or

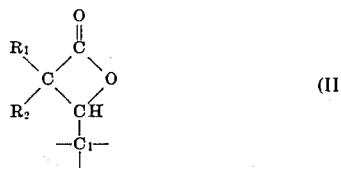 (II)

wherein $C_1$ and $C_2$ are, independently, carbon atoms in the main polyalkylene chain, R and R' are, independently, hydrogen, alkyl groups of up to about 20 carbon atoms, phenyl, —COOH or a segment of the polyalkylene chain, and $R_1$ and $R_2$ are, independently, alkyl, aryl, aralkyl, alkaryl, or the like, of up to about 20 carbon atoms.

DETAILED DESCRIPTION OF THE INVENTION

Process

The process of the instant invention may suitably be carried out in the following manner:

1. A reactive or polar substrate is treated with the composition of this invention in a number of well-known ways, such as, for instance, dipping, padding, spraying and the like. It is suitable to treat the fiber with from about 5 to about 100 weight % wet pick-up of the total composition, 40 to 80 weight % being preferred.

The composition is suitably an inert anhydrous solvent which contains from about 0.05 to about 20 weight % (preferably 0.1 to 3 weight %) of one or more of the reactive polymers.

2. The excess solvent may then be removed by, for instance, using heat and/or gaseous flow, or simultaneously removed during step (3) below.

3. The treated substrate is subjected to a thermal cure to cross-link the reactive polymer.

It is to be noted that positive pressures may be utilized in (1) above to aid in impregnating the substrate with the polymer-laden solvent. For instance, pressures of up to about 150 p.s.i.a. may be utilized to assist in the impregnation of solid or particulate wood. Other uses of positive pressure for assisting in the impregnation of substrates, and of negative pressure to assist in the removal of excess solvent, will be apparent to those skilled in this art.

Those reactive or polar substrates which are amenable to the process and composition of this method include bulk wood, particulate wood, paper, starch, wood pulp, pressboard, and the like, as well as textile fibers such as cotton, wool, cotton-wool blends, cotton-polyester blends, wool-polyester blends, and other reactive or polar natural and synthetic substrates, and their blends, such as leather (natural and synthetic), fur (natural and synthetic), hair, jute, hemp, silk and the like.

The various natures of the above substrates require some variation in the process to achieve optimum results. The most desirable conditions for each type of substrate is outlined below:

1. Bulk wood and pressboard

The substrate may be impregnated in any one of the above-mentioned ways; however, it is preferred to utilize positive pressure to improve and speed penetration. A wet pick-up of about 15 weight % to saturation with a 0.1 to 15 weight % polymer solution is generally suitable.

After removal of excess solvent by, for instance, the aforementioned techniques, the substrate is suitably subjected to cure conditions of about 80°–150°C. for at least about 30 minutes.

2. Paper, wood pulp, particulate wood, starch, etc.

These substrates may again be impregnated in any of the above ways. Pressure is not generally necessary, but may be utilized to assist impregnation, if desired. A wet pick-up of about 5 weight % to saturation (preferably at least about 40 weight %) with a 0.5 to 10 weight % polymer solution is generally suitable.

After removal of excess solvent the substrate is suitably subjected to cure conditions of about 80°–170°C. for about 0.1 to 60 minutes, as necessary.

3. Cotton, wool, blends, leather, fur, fibers generally, etc.

These substrates may once again be impregnated in any of the above standard ways. Pressure considerations are the same as in 2 above. A wet pick-up of about 10 weight % to 100 weight % (preferably 40 to 80 weight %) with a 0.3 to 10 weight % (preferably 0.5 to 5 weight %) polymer solution is generally suitable for this application.

The cure conditions taught in 2 above also apply for these substrates.

Solvents

Solvents which are suitable in the method of this invention, as well as in the preparation of the polymeric compositions, as taught below, include chlorinated hydrocarbon solvents, such as 1,1,1-trichloroethane, perchloroethylene, ethylene dichloride, methylene chloride, o-dichlorobenzene and the like; other organic solvents such as benzene, toluene, dioxane, xylene, heptane and higher aliphatics; alkyl acetates; tetrahydrofuran; fluorohalocarbons such as trichlorofluoromethane, trifluorotrichloroethane, dibromotetrafluoroethane, tetrachlorodifluoroethane and those fluorohalocarbons which are suitable for use herein for aerosol applications; and mixtures of the above. Preferred solvents include perchloroethylene and 1,1,1-trichloroethane and methylene chloride.

Polymeric Compounds

The polymeric compounds useful in the method and compositions of this invention include those of Formulas I or II as defined above and their mixtures. Suitable are those polymers with molecular weights of from about 800 to those of high polymers, while 1,000 to about 6,000 is preferred.

The various precursor polymers utilized to prepare the polymeric compounds utilized herein are known to the art, generally being olefin/acid or olefin/acid halide polymers. They may be prepared according to a number of U.S. Pat. Nos. including 3,441,545, 3,310,518, 3,361,842 and 3,413,272.

They are typically prepared by polymerizing an alpha olefin, such as ethylene and/or propylene, with an alpha-, beta-ethylenically unsaturated carboxylic acid, in the presence of a catalyst and under superatomospheric pressure generally greater than about 10,000 psi. These polymers may then be modified to, for instance, acid halides, esters, amides and the like. They may be prepared from monomers which are well known in the art, including such compounds as alkenes and alkadienes, such as ethylene, propylene, butene, isobutene, pentene, hexene, octene, butadiene, isoprene, etc., (the term alkenes is intended to also include cycloalkenes, such as cyclohexene); unsaturated esters, such as acrylate- and methacrylate-containing monomers, such as alkyl and cycloalkyl (1 to 20 carbon atoms) acrylates and methacrylates, such as methyl methacrylate, ethyl acrylate, t-butyl acrylate, 2-ethylhexyl methacrylate, cyclohexyl acrylate and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylonitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated and brominated derivatives of the above.

The reactive polymeric compounds, then, are prepared from the above precursors by different routes depending upon the nature of the reactive group, said groups being represented by Formulas I and II above. Each type will be discussed separately with respect to its preparation:

A. β-lactone-Containing Polymers of Formula I

Polyalkylene copolymers containing interlinking beta-lactone groups of the formula

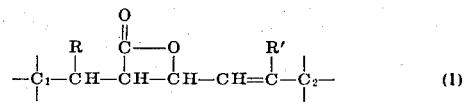

are prepared by treating an olefin-alkylene carboxylic acid copolymer containing at least one group of the formula

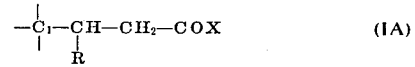

with a tertiary amine to interlink at least two segments of said copolymers through a beta-lactone group of Formula (I), wherein $C_1$ and $C_2$ are, independently, carbon atoms in the polyalkylene chain; R and R' are, independently, hydrogen, alkyl groups of up to about 20 carbon atoms, phenyl, —COOH or a segment of the polyalkylene chain and X is a halogen such as chlorine or bromine.

The precursor olefin-carboxylic acid copolymer may be derived as described above. There is the requirement, however, that the monomers used to prepare said precursor polymers contain at least about 4 to 5 weight percent based on total starting polymer of one or more monomers which will result in, or may be modified to, one or more groups pendant from, or terminal to, the polymer backbone, said groups being of Formula (IA) above.

Examples of said monomers include acrylic acid, itaconic acid, cinnamic acid and the acid halides thereof and crotonoic acid, 3-butenoic acid, 4-pentenoic acid, 3-hexenoic acid and the like and the acid halides thereof.

It is to be noted that $C_1$ and $C_2$ may be in a single polymer chain, thereby resulting in a "cyclic" polymer.

These copolymers, then may suitably be prepared by contacting about 0.005 to 20.0 weight % (preferably 1.0 to 2.0 weight %) of the acid halide-containing polymer in a suitable inert solvent with agitation and under anhydrous conditions at no more than about 60°C. (preferably 20° to 30°C.), with a tertiary amine compound. The beta-lactone-containing polymer results.

Tertiary amines which are suitable include trialkyl and triaralkyl amines, such as trimethylamine, triethylamine, triisopropylamine, diethylmethylamine, ethylmethylpropylamine and tribenzylamine; tertiary cyclic amines, such as N-ethylpiperidine, N-isopropylpiperidine, N-methylhexahydroazepine, N-ethylpyrrolidine; and tertiary polyalkylenepolyamines, such as N,N'-diethyl-N,N'-dimethylethylenediamine.

It is to be noted that the amount of residual acid halide groups desired on the beta-lactone-containing polymer, if any, will dictate the amount of tertiary amine to be utilized. If it is desired to lactonize all, or substantially all, the above groups, generally a slight excess over equivalency is to be utilized. Generally from about 1 to 100 amine equivalents per acid halide equivalent are suitable, while 3 to 5 are preferred.

Pressure is not a critical variable in the lactonization process taught herein, and may suitably be super-, sub- or atmospheric pressures.

It is to be noted that these beta-lactone-containing polymers will generally cross-link in storage when the concentration of said polymer in solvent exceeds about 4 to 6 weight percent. However, the polymers may be made in concentrations of up to 20 weight percent and then diluted. Even if partial cross-linking occurs, the remaining reactive groups may be utilized as taught herein. Also, heating the solution above about 60°C. for a period of time in excess of about one hour will also result in coss-linking. Further, addition to the solution of a non-solvent (such as acetone, pentane and the like) may cause a loss of solubility of the polymer, thereby resulting in at least some cross-linking.

The preferred reactive copolymers of Formula (I) include those which are derived by the above method from precursor polymers of the general formula (designating copolymerized moieties) $A_{(35-95\ wt.\%)}$ $B_{(0-40\ wt.\%)}$ $C_{(5-25\ wt.\%)}$ $D_{0-30\ wt.\%)}$, A, B, C and D suitably being in any order, wherein A is ethylene, B is propylene, C is acrylic acid, and D is one of methyl acrylate, ethyl acrylate, methyl methacrylate, ethyl methacrylate, isobutylacrylate, acrylonitrile, or the like. More preferably, propylene is present at from 0 to about 10 weight %.

For further details regarding this particular polymer, see copending application Ser. No. 11,361, entitled "Reactive Beta-Lactone-Containing Polymers and a Method for Their Preparation," filed concurrently herewith, now U.S. Pat. No. 3,687,909.

B. β-Lactone-Containing Polymers of Formula II

Polyalkylene copolymers containing beta-lactone groups of the formula

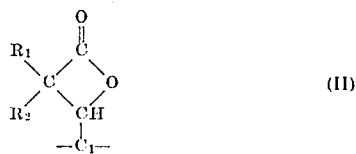
(II)

are prepared by treating a polyalkylene copolymer containing at least one group of the formula

(IIA)

with a keto-ketene of the formula

(IIB)

to form one or more beta-lactone groups of Formula (II), wherein $C_1$ is a carbon atom in the polyalkylene chain, and $R_1$ and $R_2$ are, independently, aryl, alkyl, alkaryl, aralkyl or like groups of up to about 20 carbon atoms.

The precursor polyalkylene copolymer may, as in A, be derived as described above. However, in this case there is the requirement that the monomers used to prepare said precursor polymers contain at least one monomer group which will result in a group of Formula (IIA) above. Examples of said monomers include acrolein, methacrolein, crotonaldehyde, cinnamaldehyde, tigaldehyde, α-methylisocrotonaldehyde, 3-butenal, 3-methyl-2-butenal, β-methylcrotonaldehyde and the like.

The beta-lactone-containing polymers utilized in this invention, then, may suitably be prepared by reacting, at no more than about 60°C. (preferably 20° to 30°C.), 0.005 to about 20 weight percent (preferably 1 to 2 weight %) of the —CHO group-containing polymer in a suitable solvent, with a keto-ketene of Formula (IIB) above. The beta-lactone-containing polymer results.

Suitable keto-ketenes include, for example, diphenyl ketene, dimethyl ketene, ethylbutyl ketene, diethyl ketene, phenylpropyl ketene, hexylphenyl ketene, diisopropyl ketene, dibenzyl ketene, phenylethyl ketene, ethylmethyl ketene, methylphenyl ketene and the like.

It is to be noted that the amount of residual aldehyde groups desired on the beta-lactone-containing polymer, if any, will dictate the amount of keto-ketene to be utilized. If it is desired to lactonize all, or substantially all, the above groups, generally a slight excess over equivalency is to be utilized. Generally from about 0.5 to about 5 keto-ketene equivalents per polymeric aldehyde equivalent is suitable while 1 to 3 is preferred.

Pressure is not a critical variable in the method of this invention and may suitably be sub-, super- or atmospheric.

The same cautions regarding storage as were taught in A apply to this polymer.

Preferred polyalkylene precursor polymers for preparing Formula II polymers are of the formula (designating copolymerized moieties) $A_{(30-99\%)}$ $B_{(0-40\ \%)}$ $C_{(1-70\%)}$ $D_{(0-69\%)}$, A, B, C and D suitably being in any order, wherein A is ethylene, B is propylene, C is a monomer which will result in an aldehyde group of formula (IIA), and D is one or more unsaturated ester, amide and/or nitrile as enumerated above, all %'s being weight % of total.

The more preferred copolymers of this invention include those which are prepared from the keto-ketenes, specified herein, and the precursor polymers illustrated below. All %'s are weight percent of total, and the legend for the symbols used follows the list:

| | | | | |
|---|---|---|---|---|
| 1) | E (45–99%) — | P (0–40%) | — A (1–15%) | |
| 2) | E (25–98%) — | do. | do. | — VA (1–20%) |
| 3) | do. | do. | do. | — EA (do.) |
| 4) | do. | do. | do. | — MA (do.) |
| 5) | do. | do. | do. | — IBA (do.) |
| 6) | do. | do. | do. | — MMA (do.) |
| 7) | E (45–99%) — | do. | — M (1–15%) | |
| 8) | E (25–98%) — | do. | —do. | — VA (1–20%) |
| 9) | do. | do. | —do. | — EA (do.) |
| 10) | do. | do. | —do. | — MA (do.) |
| 11) | do. | do. | —do. | — IBA (do.) |
| 12) | do. | do. | —do. | — MMA (do.) |
| 13) | E (30–99%) — | do. | — C (1–30%) | |
| 14) | do. | do. | — CM (do.) | |
| 15) | do. | do. | — T (do.) | |

| | | | |
|---|---|---|---|
| E | = Ethylene | MA | = Methyl Acrylate |
| P | = Propylene | IBA | = Isobutyl Acrylate |
| A | = Acrolein | MMA | = Methyl Methacrylate |
| M | = Methacrolein | C | = Crotonaldehyde |
| VA | = Vinyl Acetate | CM | = Cinnamaldehyde |
| EA | = Ethyl Acrylate | T | = Tigaldehyde |

For further details regarding this particular reactive polymer, see copending application Ser. No. 11362, entitled "Reactive Beta-Lactone-Containing Polymers and a Method for Their Preparation," filed concurrently herewith, now U.S. Pat. No. 3,787,366.

For utilization in water proofing wood, paper, and like, it is preferred to use about 0.1 to about 15 weight % of one or more of the above described polymers in methylene chloride or 1,1,1-trichloroethane.

For application to textiles, fibers, and the like, such as cotton, wool, blends, leather, fur, etc., it is preferred to use about 1.0 to about 5.0 weight % of one or more polymers described above, most preferably about 1.0 to about 3.0 weight % in perchloroethylene or 1,1,1-trichloroethane.

Specific Embodiments

EXAMPLE 1

Substrates were treated utilizing the process and compositions of this invention. The procedure was generally as follows:

A 1% by weight solution of the indicated polymer (legend below) in 1,1,1-trichloroethane was applied to the substrate by the indicated method. The add-on is the weight of polymeric material retained by the substrate after application and removal of the excess solvent. The treated substrates were then subjected to curing conditions, i.e., 120°C. for the indicated time.

The results with respect to water repellency are shown below in Table I.

carefully to insure uniformity of add-on. The fabric was allowed to air dry, and was then thermally cured in an oven at the specified temperature and time. The add-on is, once again, the weight of polymeric material retained by the fabric.

Two results are given — % Shrinkage Reduction on some and Spray Rating on others.

A sample of about 8 inches to a side was prepared and a square 5 inches to a side ruled off within the interior of the sample. The sample was then labeled, washed and dried. The dimensions were again taken, and the following formula used to calculate % area shrinkage:

[(Area of unwashed wool - Area after washing) × 100/Area of unwashed wool]

% Shrinkage Reduction is 100% minus the % Area Shrinkage.

The Spray Test consisted of allowing a spray of water to fall onto the fabric, under controlled conditions, and comparing the effect with a standard chart. The resistance of the fabric to surface wetting was measured, without accounting for penetration. The results are rated numerically from 0 to 100 for surface wetting as described below:

100 — No sticking or wetting of the upper surface
90 — Slight random sticking or wetting of upper surface
80 — Wetting of upper surface at spray points

TABLE I

| Ex. No. | Polymer Type | Substrate | Weight % Add-on | Cure Time (min.) | Treatment Method | Results |
|---|---|---|---|---|---|---|
| 1 | A | Yellow Pine (Pieces)* | 0.2 | 15 | Soaking | Resisted wetting by $H_2O$ beads for over 30 minutes |
| 2 | A | Cellulose Powder | 0.4 | 5 | Wetting | Floated on surface of $H_2O$ several weeks without wetting |
| 3 | A | Filter Paper | 0.5 | 3 | Wetting | $H_2O$ beads evaporated without any signs of wetting |

A — Ethylene (60 wt. %) Propylene (27 wt. %) Beta-Lactone-Pendant (13 wt. %), M.W. = 3600
*This example was repeated using white pine, fir, birch, and mahogany and the same results obtained.

EXAMPLE 2

A small swatch of wool fabric was placed in a flat-bottomed glass container and a 10 ml. portion of about 1.5 weight % of a polymer in 1,1,1-trichloroethane was added to the swatch by pipette. The addition was made 70 — Partial wetting of whole or upper surface
50 — Complete wetting of whole or upper surface
0 — Complete wetting of whole or upper and lower surfaces The following Table II gives a representative example:

TABLE II

| Ex. No. | Fiber Type | Polymer Type | Wt. % Add-on | Cure Time (min.) | Cure Temp. | % Shrinkage Reduction | Spray Rating |
|---|---|---|---|---|---|---|---|
| 1 | wool | A | 0 | 15 | 120°C | 12 | 50 |
| 2 | wool | A | 0.5 | 15 | 120°C | 5 | — |
| 3 | wool | A | 1.0 | 15 | 120°C | 2 | — |
| 4 | wool | A | 2.0 | 15 | 120°C | 1 | — |
| 5 | wool | A | 10.0 | 15 | 120°C | 0 | — |
| 6 | wool | A | 1.5 | 15 | 120°C | — | 80 |
| 7 | cotton | A | 0 | 5 | 130°C | — | 0 |
| 8 | cotton | A | 1.0 | 5 | 130°C | — | 90 |
| 9 | cotton | A | 1.7 | 5 | 139°C | — | 100 |

A — Ethylene (60 wt. %) propylene (27 wt. %) β-lactone (13 wt. %), M.W. = 36.00.

EXAMPLE 3

The following reactive lactone-containing polyalkylene copolymers were prepared and were found, employing substantially the same procedure described above, to impart water-resistant properties to paper and other reactive or polar substrates.

TABLE III

REACTIVE INTERPOLYMERS CONTAINING ETHYLENE/PROPYLENE/PENDANT β-LACTONE

| Name of Reactive Derivative | Description |
|---|---|
| ethylene-propylene-methyl acrylate-β-lactone | grease |
| ethylene-propylene-ethyl acrylate-β-lactone | grease |
| ethylene-propylene-n-propyl acrylate-β-lactone | grease |
| ethylene-propylene-isopropyl acrylate-β-lactone | grease |
| ethylene-propylene-tert-butyl acrylate-β-lactone | grease |
| ethylene-propylene-cyclohexyl acrylate-β-lactone | grease |
| ethylene-propylene-benzyl acrylate-β-lactone | grease |
| ethylene-1-heptyl acrylate-β-lactone | grease |
| ethylene-2-octyl acrylate-β-lactone | grease |
| ethylene-propylene-tert-amyl acrylate-β-lactone | grease |
| ethylene-propylene-n-decyl acrylate-β-lactone | grease |
| ethylene-propylene-crotyl acrylate-β-lactone | grease |
| ethylene-propylene-myristyl acrylate-β-lactone | grease |
| ethylene-propylene-cetyl acrylate-β-lactone | grease |
| ethylene-propylene-acryl N-isopropylamide-β-lactone | wax |
| ethylene-propylene-sorbitol acrylate-β-lactone | grease |
| ethylene-propylene-2-hydroxyethyl acrylate-β-lactone* | grease |
| ethylene-propylene-2,3-dihydroxypropyl acrylate-β-lactone* | wax |
| ethylene-propylene-bisphenol acrylate-β-lactone* | wax |
| ethylene-propylene-β-lactone-amide of ethylenediamine* | wax |
| ethylene-propylene-β-lactone -acrylate of dipropyleneglycol* | wax |
| ethylene-propylene-β-lactone-acrylate of P-400* | solid |
| ethylene-propylene-β-lactone-acrylate of P-4000* | solid |
| ethylene-propylene-β-lactone-amide of PEI-6* | solid |
| ethylene-propylene-β-lactone-mixed amide and acrylate of N-ethyl ethanolamine* | solid |
| ethylene-propylene-β-lactone-mixed amide and acrylate of 1,3-diaminopropanol-2* | solid |

All products prepared in 1% concentration in Chlorothene solution.

*Partially crosslinked, insoluble or slightly soluble in chlorinated and other organic solvents.

EXAMPLE 4

Lactones prepared by the action of keto-ketenes on low molecular weight polyalkylene copolymers containing pendant —CHO groups are dissolved in suitable solvents and employed, in substantially the same manner as in Examples 1 and 2, to impart water-resistance to paper and other reactive or polar substrates.

Of special interest as precursor polymers are polyalkylene copolymers prepared by copolymerizing a major amount of ethylene with a minor amount of acrolein or methacrolein.

We claim:

1. A process for improving the dimensional stability or water repellency of reactive or polar substrates which comprises treating the substrate with from 5 to 100 weight % wet pick-up of treating composition, and curing the treated substrate at from about 80°C to about 170°C for about 0.1 minute to about 3 hours wherein the said treating composition comprises an inert anhydrous solvent containing from about 0.05 to about 20 weight percent of one or more reactive polyalkylene copolymers of the formulas

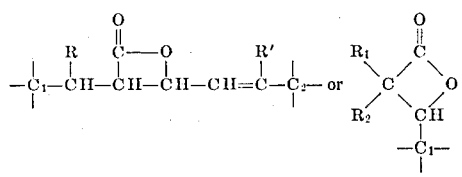

wherein $C_1$ and $C_2$ are, independently, carbon atoms in the polyalkylene chain, said chain being a polymeric series of alkylene groups; R and R' are, independently, hydrogen, an alkyl group of up to about 20 carbon atoms, phenyl, —COOH, or a segment of the polyalkylene chain; and $R_1$ and $R_2$ are, independently, alkyl, aryl, aralkyl or alkaryl groups of up to about 20 carbon atoms, said polyalkylene copolymer having a molecular weight of from about 800 to those of high polymers.

2. The process of claim 1 wherein the wet pick-up is from 40 to 80 weight percent.

3. The process of claim 1 wherein positive pressure is utilized to assist in the application of the polymeric material to the substrate.

4. A substrate with improved water repellency as produced by the process of claim 1.

5. The process of claim 1 wherein the polyalkylene copolymer is one designated by the formula

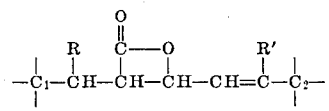

6. The process of claim 1 wherein the polyalkylene copolymer is one designated by the formula

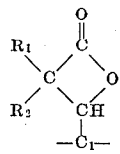

7. The process of claim 1 wherein the concentration of the polyalkylene copolymer in the inert anhydrous solvent is in the range of from about 0.1 to about 3 weight percent.

* * * * *

UNITED STATES PATENT OFFICE
CERTIFICATE OF CORRECTION

PATENT NO. : 3,860,441
DATED : January 14, 1975
INVENTOR(S) : Walter L. Vaughn, Sherman Kottle, Richard H. Symm It is certified that error appears in the above-identified patent and that said Letters Patent are hereby corrected as shown below:

Col. 1, line 25-26, enclose the expression -- closed loop -- within quotations marks.

Col. 4, line 34, after "4-pentanoic acid,", insert -- 3-pentenoic acid, 5-hexenoic acid, 4-hexenoic acid, --.

Col. 7, line 6, after "and", insert -- the --.

Col. 8, bottom line below Table II, correct "36.00" to --3600 --.

*Signed and Sealed this*

*seventh* Day of *October 1975*

[SEAL]

Attest:

RUTH C. MASON
Attesting Officer

C. MARSHALL DANN
Commissioner of Patents and Trademarks